(12) United States Patent
Dominguez Cuevas et al.

(10) Patent No.: US 10,246,031 B1
(45) Date of Patent: Apr. 2, 2019

(54) SELF-RETAINING ANGLED FASTENING DEVICE FOR SECURING A COMPONENT TO A PANEL IN A VEHICLE

(71) Applicant: GM GLOBAL TECHNOLOGY OPERATIONS LLC, Detroit, MI (US)

(72) Inventors: Jesus Edgar Dominguez Cuevas, Jiutepec (MX); Alejandro Barrera Torres, Metepec (MX); Carlos Alfonso Gutierrez Miranda, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/705,676

(22) Filed: Sep. 15, 2017

(51) Int. Cl.
*F16M 11/00* (2006.01)
*B60R 13/02* (2006.01)
*B60J 5/04* (2006.01)

(52) U.S. Cl.
CPC ......... *B60R 13/0206* (2013.01); *B60J 5/0469* (2013.01); *B60R 13/0243* (2013.01)

(58) Field of Classification Search
CPC .............................. F16B 5/065; B60R 13/0206
See application file for complete search history.

(56) References Cited

U.S. PATENT DOCUMENTS

| 8,388,289 B2 | 3/2013 | Mazur et al. |
| 2011/0219588 A1* | 9/2011 | Inoue ...................... F16B 5/065 24/458 |

* cited by examiner

*Primary Examiner* — Amy J. Sterling

(57) ABSTRACT

A fastening device for connecting a mountable vehicle component to a hole in a first panel includes a face plate with a first side and a second side. The face plate defines a first plane. The fastening device also includes a cantilevered extension plate including a proximal end and a distal end. The extension plate is connected to the face plate at the proximal end and projects away from the first side of the face plate toward the distal end. The extension plate defines a second plane disposed at an offset angle from the first plane. The fastening device also includes a retention member connected to the face plate and that projects away from the second side of the face plate. The retention member includes a first shoulder configured to engage an edge of the hole to retain the face plate to the first panel.

16 Claims, 6 Drawing Sheets

SELF-RETAINING ANGLED FASTENING DEVICE FOR SECURING A COMPONENT TO A PANEL IN A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a self-retaining angled fastening device for securing a component to a panel in a vehicle.

A typical vehicle door structure includes an outer sheet metal door panel attached to an inner sheet metal door panel. An interior trim panel is then typically affixed to the inner door panel. An interior trim panel often includes a door handle and/or a door pull cup. The interior trim panel undergoes significant stresses during use because a vehicle occupant pulls or pushes on the door handle and/or the door pull cup on the interior trim panel to close or open the door. Various attachment structures can be used to connect the interior trim panel to the inner door panel.

One example attachment structure is to connect the interior trim panel directly to the inner door panel. Such an attachment structure requires that the inner door panel has a suitable formation in order to connect the interior trim panel to the inner door panel. The inner door panel, however, cannot be formed into any shape due to limitations of sheet metal formability, packaging limitations and aesthetic appearance limitations. Other attachment structures, therefore, are needed.

SUMMARY

In one example embodiment in accordance with the present disclosure, a fastening device for connecting a mountable vehicle component to a hole in a first panel includes a face plate with a first side and a second side. The face plate defines a first plane. The fastening device also includes a cantilevered extension plate including a proximal end and a distal end. The extension plate is connected to the face plate at the proximal end and projects away from the first side of the face plate toward the distal end. The extension plate defines a second plane disposed at an offset angle from the first plane. The fastening device also includes a retention member connected to the face plate and that projects away from the second side of the face plate. The retention member includes a first shoulder configured to engage an edge of the hole to retain the face plate to the first panel.

In one aspect, the retention member includes a first flexible arm projecting away from the second side of the face plate. The first flexible arm includes a first knee and the first shoulder. The retention member also includes a second flexible arm projecting away from the second side of the face plate. The second flexible arm includes a second knee and a second shoulder wherein the first knee and the second knee move toward one another and contact each other when an external force is exerted on the extension plate.

In one aspect, the first flexible arm includes a first outward-extending portion and a first return portion. The first flexible arm projects away from the second side of the face plate along the first outward-extending portion before bending back toward the second side of the face plate at the first knee. The first flexible arm projects back toward the second side of the face plate along the first return portion before terminating at the first shoulder.

In one aspect, the second flexible arm includes a second outward-extending portion and a second return portion. The second flexible arm projects away from the second side of the face plate along the second outward-extending portion before bending back toward the second side of the face plate at the second knee. The second flexible arm projects back toward the second side of the face plate along the second return portion before terminating at the second shoulder.

In one aspect, the first outward-extending portion defines a third plane and the second outward-extending portion defines a fourth plane. The third plane and the fourth plane are disposed at an acute angle to one another such that the first knee and the second knee are closer to one another than the first shoulder and the second shoulder.

In one aspect, the first flexible arm includes a third shoulder. The third shoulder spaced apart from the first shoulder by a first notch. The second flexible arm includes a fourth shoulder. The fourth shoulder spaced apart from the second shoulder by a second notch. The first shoulder and the third shoulder are configured to engage a first edge of the hole to retain the face plate to the first panel and the second shoulder and the fourth shoulder are configured to engage a second edge of the hole to retain the face plate to the first panel.

In one aspect, the first flexible arm includes a first neck portion with a first height. The first neck portion connects the face plate to the first outward-extending portion. The first height of the first neck portion is less than a height of the first notch such that the first neck portion fits between the first shoulder and the second shoulder in the first notch when the first flexible arm flexes toward the first outward-extending portion.

In one aspect, the first shoulder of the retention member is configured to move from a first position to a second position. The first shoulder flexes toward a center of the face plate in the first position to permit the retention member to pass through the hole in the first panel. The first shoulder flexes away from the center of the face plate in the second position to engage the edge of the hole in the first panel to retain the face plate to the first panel.

In one aspect, the face plate includes a first footing and a second footing. The first footing is disposed above the retention member and is configured to fit flushly against the first panel. The second footing is disposed below the retention member and is configured to fit flushly against the first panel.

In one aspect, the face plate, the extension plate and the retention member are integrally formed from a single blank of metal.

In one aspect, the extension plate includes an attachment point at the distal end for connecting the mountable vehicle component to the fastening device.

In one aspect, the attachment point comprises a rectangular hole configured to receive a clip nut.

In one aspect, the fastening device further includes an anti-rotation tab projecting away from the second side of the face plate. The anti-rotation tab is configured to engage a second edge of the hole to prevent rotation of the face plate relative to the first panel.

In one aspect, the offset angle of the fastening device is less than 90 degrees.

In one aspect, the offset angle of the fastening device is 60 degrees.

In one aspect, the first return portion bends toward the first outward-extending portion to form the first shoulder.

In one aspect, the first outward-extending portion, the first knee and the first return portion form a U-shape.

In another example embodiment in accordance with the present disclosure, a fastening device for connecting a mountable vehicle component to a hole in a first panel includes a face plate having a first side and a second side. The face plate defines a first plane. The fastening device also includes a cantilevered extension plate including a proximal end and a distal end. The extension plate is connected to the face plate at the proximal end and projects away from the first side of the face plate toward the distal end. The extension plate defines a second plane disposed at an offset angle from the first plane. The fastening device also includes a retention member that is connected to the face plate and projects away from the second side of the face plate. The retention member includes a first flexible arm having a first shoulder and a second flexible arm having a second shoulder. The first shoulder and the second shoulder are spaced apart from each other and are configured to engage opposite side edges of the hole to retain the face plate to the first panel.

In one aspect, the first flexible arm projects away from the second side of the face plate and bends back toward the face plate at a first knee. The second flexible arm projects away from the second side of the face plate and bends back toward the face plate at a second knee. The first flexible arm and the second flexible arm are configured to move from a first position in which the first knee and the second knee are separated by a gap to a second position in which the first knee and the second knee contact one another in response to an external force being exerted on the extension plate when the fastening device is retained to the first panel.

In one aspect, the first flexible arm and the second flexible arm are symmetrical to one another about a vertical plane positioned at a center of and orthogonally to the face plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The self-retaining angled fastening device according to the present disclosure is secured to a panel to provide an attachment surface that is positioned at an offset angle relative to the panel surface. Such a fastening device is particularly suited for attaching a piece of interior trim, such as a door trim panel, to the inner door sheet metal panel in a vehicle. The fastening device, however, can be used in other applications as well.

A door trim panel typically requires secure attachments at or near the door handle and/or the door pull cup because of the stresses imparted on the door trim panel from the repeated opening and closing of the vehicle door. The attachments often include one or more fasteners that are driven through the door trim panel and into a complimentary fastener mounted to the door sheet metal panel. If the fastener cannot be driven directly into the complimentary fastener mounted to the door sheet metal panel, a fastening device, such as one according to the present disclosure, is needed in order to provide a suitable mounting surface for the door trim panel. Such a mounting surface can be oriented at an angle that is offset from a plane defined by the surface of the door sheet metal panel.

Existing fastening devices are often secured to the door sheet metal panel using screws, nuts or other fasteners. The fastening device according to the present disclosure includes a retention member that secures the fastening device to the door sheet metal panel without the need for additional fasteners. The retention member secures the fastening device to the door sheet metal panel by inserting the retention member into an opening in the door sheet metal panel. One or more shoulders on the retention member contact one or more edges of the opening to secure the fastening device to the door sheet metal panel. The fastening device quickly and reliably installs into the door sheet metal panel without the need for additional fasteners and provides an angled attachment surface for the door trim panel. After the door trim panel is connected to the fastening device, the retention member on the fastening device is able to withstand the stresses imparted on the fastening device from the opening and closing of the vehicle door.

Figure 1:
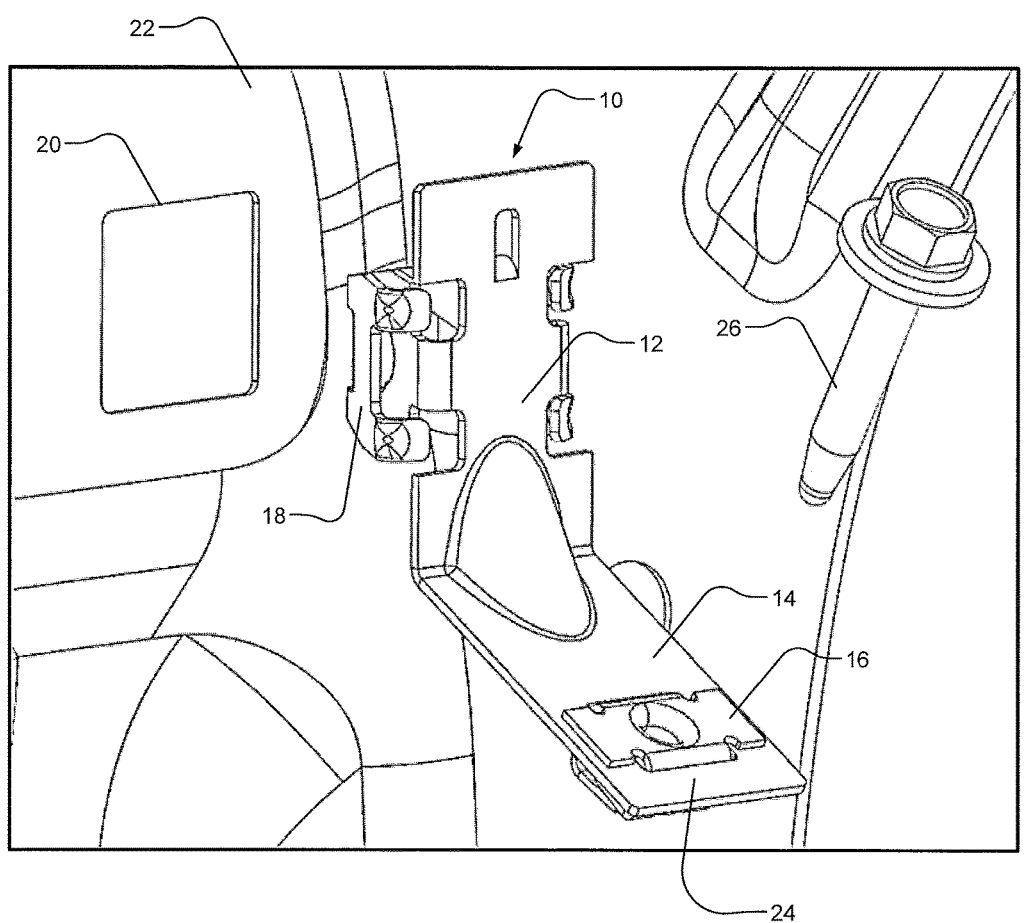
FIG. 1 is a partial exploded view of the example fastening device, a panel and a fastener in accordance with the present disclosure.

As shown in FIG. 1, one example fastening device 10 includes a face plate 12, an extension plate 14, a nut 16 and a retention member 18. The fastening device 10 is installed into an opening 20 in a panel 22. The panel 22 shown in FIG. 1 is a door inner sheet metal panel. The fastening device 10, however, can be used in other applications and secured to other panels as well.

The face plate 12 of the fastening device 10 is a planar member with a generally rectangular shape that will secure flushly to the panel 22 after the retention member 18 is inserted through the opening 20. The extension plate 14 is connected to the face plate 12 and projects away from the face plate 12 in a cantilevered configuration. The extension plate 14 includes a nut 16 located at or near a distal end 24 of the extension plate 14. The extension plate 14 with the nut 16 provides an attachment surface for the connection of a door trim panel (not shown) to the nut 16. A fastener 26, such as a screw or bolt, can be inserted through the door trim panel and into the nut 16 to secure the door trim panel (not shown) to the fastening device 10.

The extension plate 14 includes a rectangular aperture into which the nut 16 is inserted. The nut 16 can be any suitable clip nut, cage nut, spring nut or other self-retaining nut. As can be appreciated, in other example fastening devices 10, the extension plate can include other types of attachments for securing the door trim panel to the fastening device 10. For example, the extension plate 14 may include a hole through which a rivet, push pin, clip, self-tapping screw or other fastener can be installed to secure the door trim panel to the fastening device 10. In other examples, the extension plate 14 can include a threaded hole or a weld nut.

Figure 2:
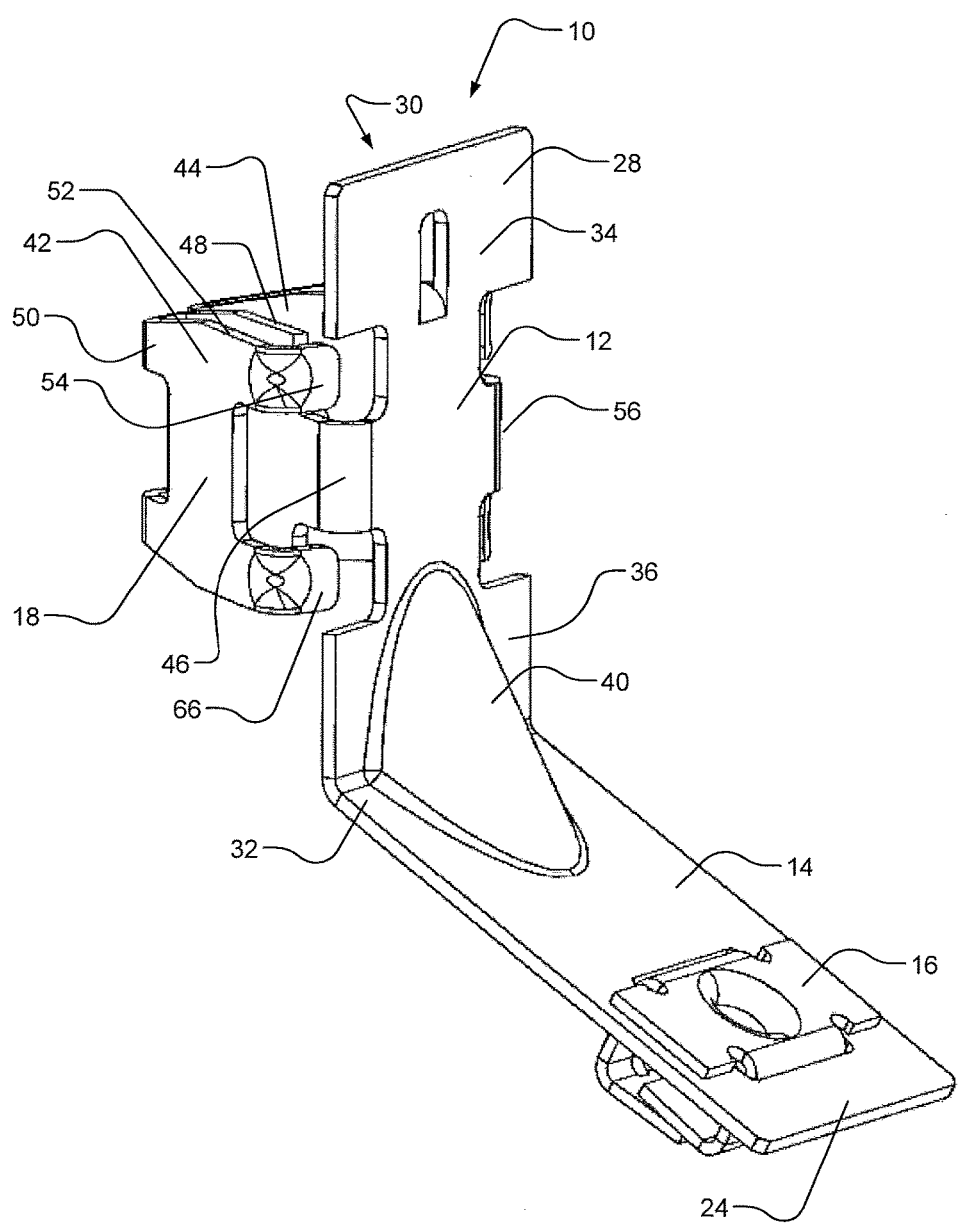
FIG. 2 is an isometric view of the example fastening device of FIG. 1.

Referring now to FIG. 2, the face plate 12 of the fastening device 10 has a first side 28 that faces away from the panel 22 when the fastening device is in the installed position and a second side 30 that faces the panel 22. The extension plate 14 is a rectangular member of the fastening device 10 that is connected to the face plate 12 at a proximal end 32. The extension plate 14 projects away from the first side 28 of the face plate 12 toward the distal end 24.

Figure 3:
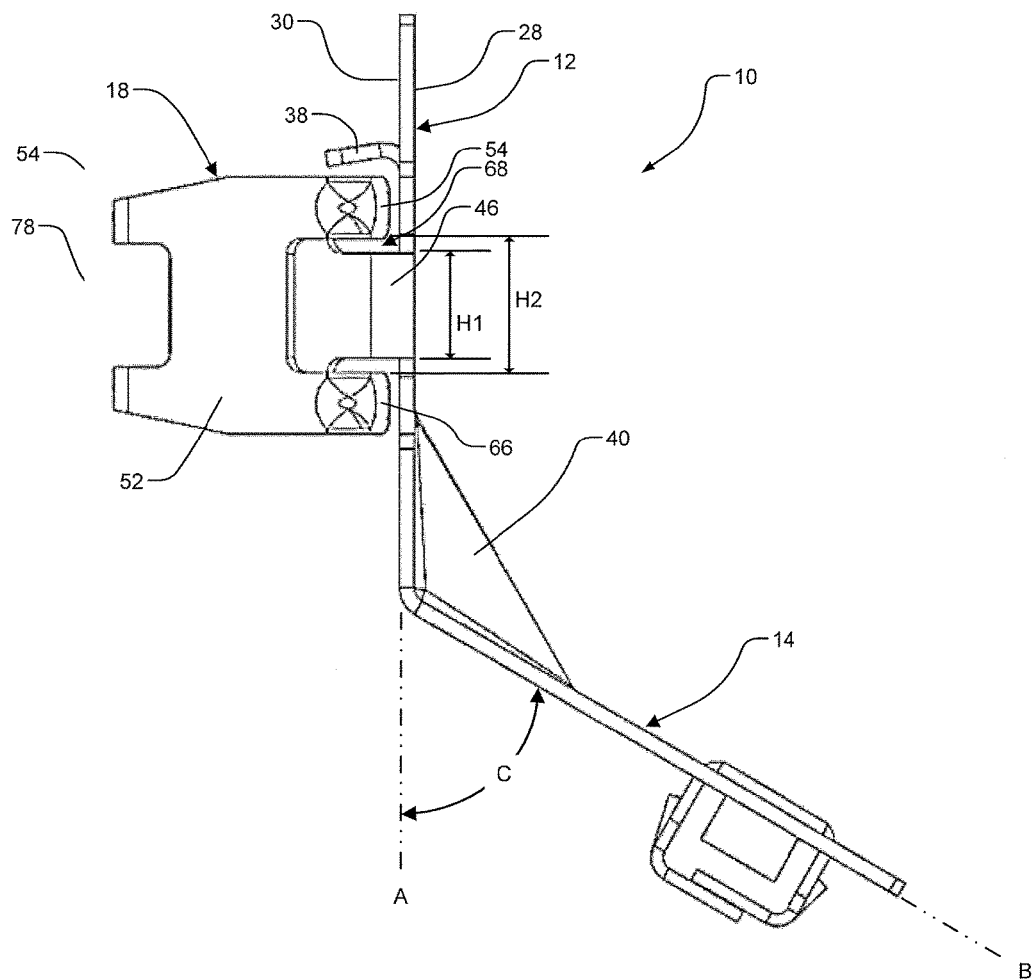
FIG. 3 is a side view of the example fastening device of FIG. 1.

As shown in FIG. 3, the fastening device 10 is a modified L-shape in which the face plate 12 defines a first plane A and the extension plate 14 defines a second plane B. The extension plate 14 is oriented at an offset angle C relative to face plate 12 as defined by the angle between plane A and plane B as shown in FIG. 3. The fastening device 10 can be configured such that the offset angle C can have any angle greater than zero and less than or equal to 90 degrees. In the example shown, the offset angle is 60 degrees. In other examples, the offset angle is in a range between 20 to 70 degrees or a range between 25 to 65 degrees.

Referring now to FIGS. 2 and 3, the face plate 12 can include a first footing 34 and a second footing 36. The first footing 34 is a portion of the face plate 12 located above the retention member 18. The first footing 34 fits flushly against the panel 22 when the fastening device 10 is installed in the panel 22. The second footing 36 is a portion of the face plate 12 located below the retention member 18. The second footing also fits flushly against the panel 22 when the fastening device 10 is installed in the panel 22. As can be appreciated, when forces are exerted at the distal end 24 of the extension plate 14, the first footing 34 and the second footing 36 can resist movement of the fastening device 10 and/or resist the disengagement of the retention member 18 from the opening 20.

The face plate 12 can also include an anti-rotation tab 38 and one or more gussets 40. The anti-rotation tab 38 is a thin flap of material that bends away from the second side 30 of the face plate 12. The anti-rotation tab 38 is configured to project into the opening 20 of the panel 22. The anti-rotation tab 38 engages a side edge of the opening 20 to resist rotation of the fastening device 10 about the opening 20. The anti-rotation tab 38 is rectangular in shape and projects slightly downward from the second side 30 of the face plate 12 to facilitate the insertion of the retention member 18 into the opening 20. In other examples, the anti-rotation tab 38 can have different shapes and different lengths so long as it engages the opening 20 to resist rotation of the fastening device 10.

The gusset 40 spans from the face plate 12 to the extension plate 14 across the intersection of the two plates at proximal end 32. The gusset 40 is a rounded formation at the intersection of the face plate 12 and the extension plate 14 that provides added strength to the fastening device 10 and resists bending that may otherwise occur. In this example, a single gusset 40 is provided. In other examples, the gusset 40 can have different shapes and sizes and/or additional gussets can be included.

The retention member 18 is connected to the face plate 12 between the first footing 34 and the second footing 36. The retention member 18 projects away from the second side 30 of the face plate 12. The retention member 18 is inserted through the opening 20 of the panel 22 and secures the fastening device 10 to the panel 22.

Figure 5:
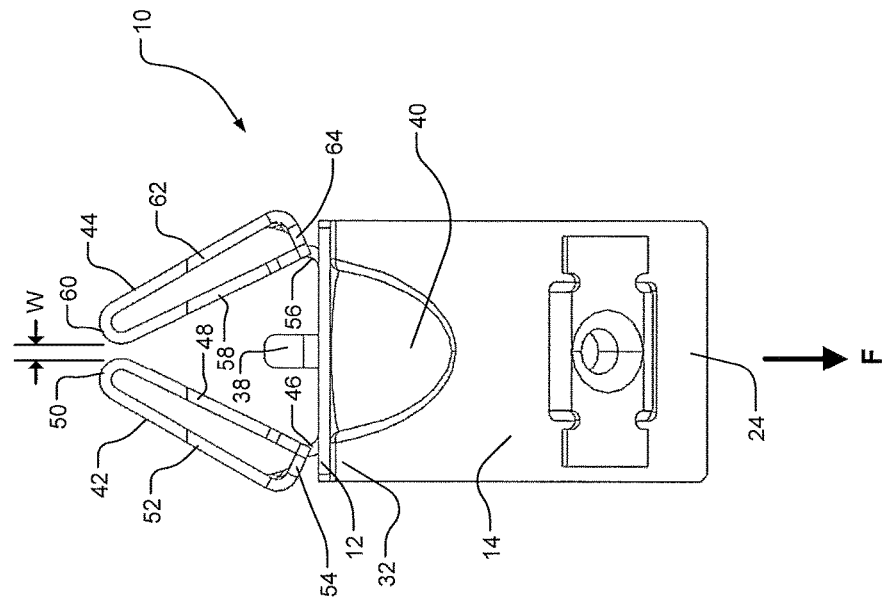
FIG. 5 is a top view of the example fastening device of FIG. 1.

As shown in FIGS. 2 and 5, the retention member 18 includes a first flexible arm 42 and a second flexible arm 44. The first flexible arm 42 includes a first neck 46, a first outward-extending portion 48, a first knee 50, a first return portion 52 and a first shoulder 54. The first flexible arm 42 is connected to the face plate 12 at the first neck 46. The first neck 46 bends away from the second side 30 of the face plate 12 and directs the first flexible arm 42 away from the second side 30 of the face plate 12. The first outward-extending portion 48 is connected to the first neck 46 and is a planar member that is angled inwardly toward the center and toward the second flexible arm 44.

The first flexible arm 42 bends again at the first knee 50 that is connected to the first outward-extending portion 48. The first knee 50 is a rounded bend in the first flexible arm 42 that directs the first flexible arm 42 back toward the face plate 12. The first knee 50, in this example, bends the first flexible arm 42 slightly less than 180 degrees such that the first return portion 52 is positioned adjacent to and spaced apart from the first outward-extending portion 48. In this manner, the first outward-extending portion 48, the first knee 50 and the first return portion 52 create a U-shape as shown in FIG. 5.

The first return portion 52 projects back toward the face plate 12 and bends inward at first shoulder 54. The first shoulder 54 of the first flexible arm 42 engages an edge of the opening 20 of the panel 22 in order to retain the fastening device 10 to the panel 22 as will be further explained below. The first flexible arm 42 bends approximately 90 degrees at first shoulder 54. The first shoulder 54 terminates approximately at the same vertical plane as the intersection of the first neck 46 and the first outward-extending portion 48.

The second flexible arm 44, in this example, is symmetrical to the first flexible arm 42 about a vertical plane positioned at the center of the face plate 12 and extending orthogonally thereto. As shown in FIG. 5, the second flexible arm 44 includes a second neck 56, a second outward-extending portion 58, a second knee, 60, a second return portion 62 and a second shoulder 64. The second neck 56, the second-extending portion 58, the second knee 60, the second return portion 62 and the second shoulder 64 are arranged and configured similarly to that previously described with respect to the first flexible arm 42 except that the second flexible arm 44 extends from the opposing edge of the face plate 12.

In this example configuration, the first flexible arm 42 and the second flexible arm 44 are angled toward one another to form a wedge shape when viewed from above as shown in FIG. 5. The first flexible arm 42 and the second flexible arm 44 are able to flex inwardly toward the center of the face plate 12 to permit the first flexible arm 42 and the second flexible arm 44 to pass through the opening 20 in the panel 22.

As can be appreciated, the outmost lateral width between the first shoulder 54 and the second shoulder 64 is greater than the width of the opening 20. When the retention member 18 is inserted into the opening 20, one or more of the edges of the opening 20 contacts the first return portion 52 and/or the second return portion 62. As the retention member 18 is inserted into the opening 20, the first flexible arm 42 and/or the second flexible arm 44 flex inwardly to permit the first shoulder 54 and the second shoulder 64 to pass through the opening 20. After passing through the opening 20, the first flexible arm 42 and/or the second flexible arm 44 flexes back outwardly toward its original position(s). In this position, the surfaces of the first shoulder 54 and the second shoulder 64 that face the face plate 12 contact the edges of the opening 20 and secure the fastening device 10 to the panel 22.

Figure 6:
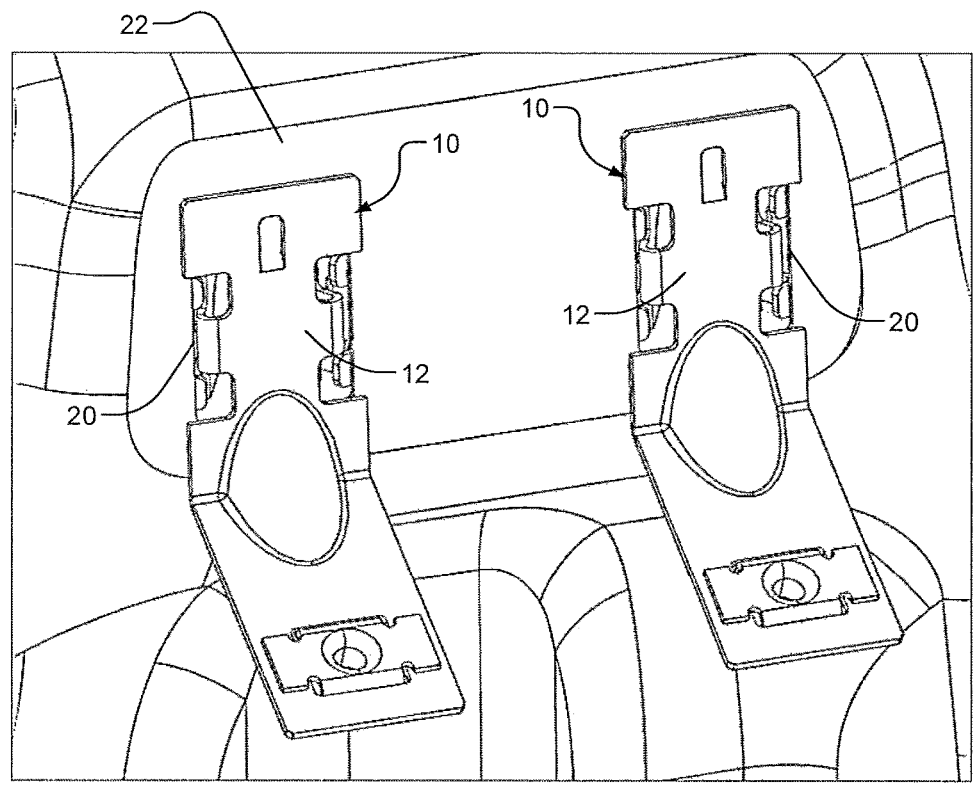
FIG. 6 is an illustration of two of the example fastening devices of FIG. 1 secured to a panel.
Figure 7:
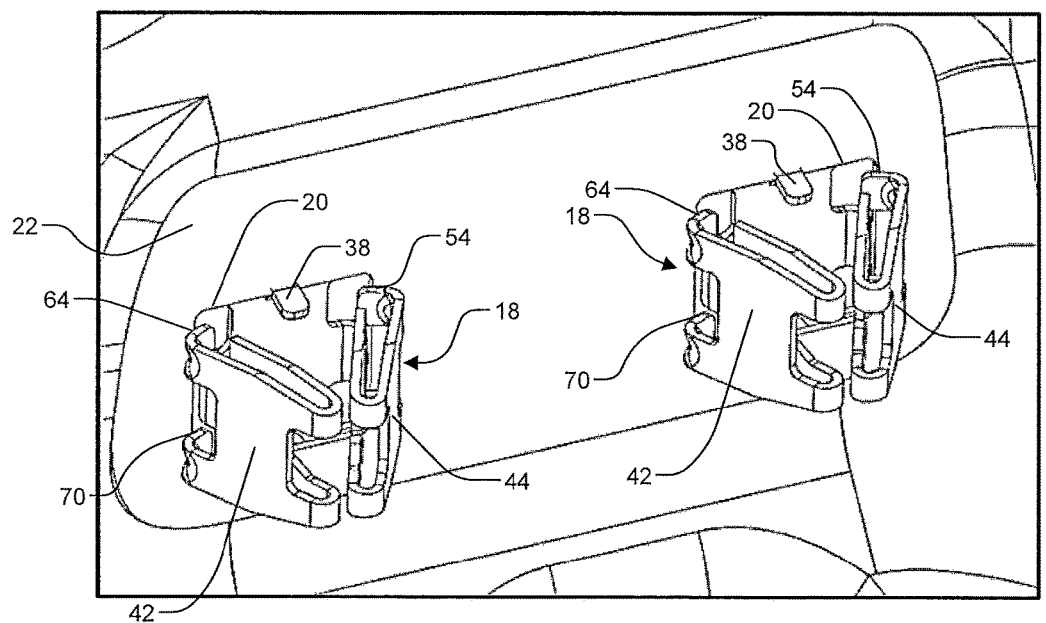
FIG. 7 is an illustration of the two example fastening devices shown in FIG. 6 as viewed from the back side of the panel.

FIG. 6 illustrates two example fastening devices 10 that have been inserted into two openings 20 in the panel 22. As can be seen, the face plates 12 fit flushly against the panel 22. The retention members 18 of the fastening devices 10 are positioned on a back side of the panel 22. As shown in FIG. 7 from the back side of the panel 22, the first shoulder 54 and the second shoulder 64 abut the edges of the openings 20 to secure the fastening devices 10 in position. As also shown (and as previously described), the anti-rotation tabs 38 extend through the openings 20 to resist the rotation of the fastening devices 10 relative to the panel 22.

Referring back to FIGS. 3 and 4, the first flexible arm 42 can include a third shoulder 66. The third shoulder 66, in the example shown, is positioned below the first shoulder 54 on the first flexible arm 42 and is shaped and positioned similarly to the first shoulder 54. The third shoulder 66 is a bend connected to the first return portion 52 that bends approximately 90 degrees from the first return portion 52 adjacent to the face plate 12. The third shoulder 66, like the first shoulder 54, engages an edge of the opening 20 to retain the fastening device 10 to the panel 22.

As further shown in this example, the first shoulder and the third shoulder 66 are separated by a first notch 68. The first notch 68 is defined by the profile of the first return portion 52 and is a rectangular opening between the first shoulder 54 and the third shoulder 66. The first notch 68 has a vertical height of H2 that corresponds to the vertical distance between the lower edge of the first shoulder 54 and the upper edge of the third shoulder 66. The first notch 68 is sized so as to permit the first shoulder 54 and the third shoulder 66 to flex inwardly beyond the first neck 46. As such, the first neck has a vertical height of H1 as shown. The vertical height H1 of the first neck 46 is less than the vertical height H2 of the first notch 68. In this manner, the first shoulder 54 and the third shoulder 66 can flex inwardly beyond the outer surface of the first neck 46 to permit the retention member 18 to flex a sufficient amount to pass through the opening 20 in the panel 22.

The second flexible arm 44 has a symmetrical structure and includes a fourth shoulder 70. The second shoulder 64 and the fourth shoulder 70 on the second flexible arm 44 are similarly spaced apart from one another by a second notch 72. The second neck 56 has a vertical height that is less than a vertical height of the second notch 72. With this relative sizing, the second shoulder 64 and the fourth shoulder 70 can flex inwardly beyond the outer surface of the second neck 56 to permit the retention member 18 to flex a sufficient amount to pass through the opening 20 in the panel 22.

Figure 4:
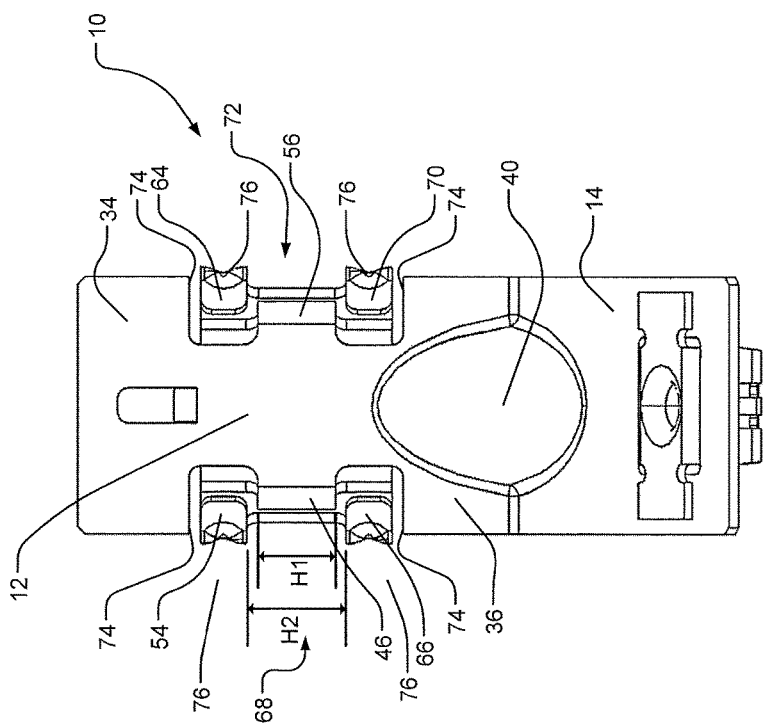
FIG. 4 is front view of the example fastening device of FIG. 1.

As shown in FIG. 4, the face plate 12 can have cut-outs 74 that are located above and below the first neck 46 and the second neck 56. The cut-outs 74 provide additional clearance between the face plate 12 and the retention member 18, including the first shoulder 54, the second shoulder 64, the third shoulder 66 and the fourth shoulder 70. The cut-outs 74 permit the first flexible arm 42 and the second flexible arm 44 to flex inwardly past the lateral side edges of the face plate 12 when the retention member 18 flexes inwardly when inserted into the opening 20 of the panel 22.

The first shoulder 54, the second shoulder 64, the third shoulder 66 and the fourth shoulder 70 can include a dart 76. The darts 76 are positioned at the corners of the first shoulder 54, the second shoulder 64, the third shoulder 66 and the fourth shoulder 70. The darts 76 are formations that span the corner of the shoulders to the first return portion 52 or the second return portion 62 to stiffen the first flexible arm 42 and the second flexible arm 44. The darts 76 reduce the likelihood that the first shoulder 54, the second shoulder 64, the third shoulder 66 or the fourth shoulder 70 will flex relative to the first return portion 52 or the second return portion 62.

As previously described, the fastening device 10 can be used to secure a door trim panel to a door inner sheet metal panel. In such applications, forces are imparted through the door trim panel to the fastening device 10 when the door of the vehicle is opened or closed. For example, when the door is closed, a vehicle occupant pulls on the door pull cup that is located in the door trim panel. This in turn imparts a force on the extension plate 14 to which the door trim panel is attached. This force pulls on the fastening device 10 in a direction away from the panel 22 in a direction along the extension plate 14. In such instances, the retention member 18 must resist this type of pull force and keep the fastening device secured to the panel 22.

When a force F is exerted on the fastening device 10 in a direction indicated by the arrow on FIG. 5, the first shoulder 54 and the second shoulder 64 (as well as the third shoulder 66 and the fourth shoulder 70) engage the edges of the opening 20 of the panel 22 (not shown). The force F is transferred through the first flexible arm 42 and the second flexible arm 44 such that the first knee 50 and the second knee 60 begin to move toward one another. As shown, in a pre-stressed condition, the first knee 50 and the second knee 60 are separated by a width W. As the force F is applied to the extension plate 14, the first knee 50 and the second knee 60 move toward one another to reduce the width W. If the force F is large enough, the width W is reduced to zero and the first knee 50 and the second knee 60 contact one another. In this position, the retention member 18 resists movement of the fastening device 10 until such time as permanent deformation occurs and the fastening device 10 fails. If no permanent deformation occurs and the force F is removed, the retention device 10 moves back to the pre-stressed condition as shown in FIG. 5.

As shown in FIG. 3, the first knee and the second knee can include a slot 78. The slot 78, in this example, creates an opening at the first knee 50 that can extend toward the face plate 12 along the first outward-extending portion 48 and/or along the first return portion 52. The second knee 60 can also include a similar slot that is similarly positioned on the second flexible arm 44. The slot 78 can be sized and configured accordingly in order to provide the desired flexibility of the retention member 18 while limiting the weight of the fastening device 10 and minimizing stress concentrations that may occur at the first knee 50 and/or the second knee 60.

The fastening device 10 can be made of steel that is stamped into a blank and then is subsequently formed to have the shape and structure as previously described. As such, the example fastening device 10 is integrally formed from a single steel blank. In other examples, the fastening device 10 can be molded or formed from separate pieces and connected together using known joining techniques such as welding, staking, or the like. In other examples, fasteners can be used to join separate pieces together. The fastening device 10 can also be made of other metals, alloys, plastics, composites or the like.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fastening device for connecting a mountable vehicle component to a hole in a first panel, the fastening device comprising:
   a face plate including a first side and a second side, the face plate defining a first plane;
   a cantilevered extension plate including a proximal end and a distal end, the extension plate connected to the face plate at the proximal end and projecting away from the first side of the face plate toward the distal end, the extension plate defining a second plane disposed at an offset angle from the first plane; and
   a retention member connected to the face plate and projecting away from the second side of the face plate, the retention member including:
      a first shoulder configured to engage an edge of the hole to retain the face plate to the first panel;
      a first flexible arm projecting away from the second side of the face plate, the first flexible arm including a first knee and the first shoulder;
      a second flexible arm projecting away from the second side of the face plate, the second flexible arm including a second knee and a second shoulder; and
      wherein the first knee and the second knee move toward one another and contact each other when an external force is exerted on the extension plate.

2. The fastening device of claim 1 wherein:
   the first flexible arm includes a first outward-extending portion and a first return portion, the first flexible arm projecting away from the second side of the face plate along the first outward-extending portion before bending back toward the second side of the face plate at the first knee, the first flexible arm projecting back toward the second side of the face plate along the first return portion before terminating at the first shoulder.

3. The fastening device of claim 2 wherein:
   the second flexible arm includes a second outward-extending portion and a second return portion, the second flexible arm projecting away from the second side of the face plate along the second outward-extending portion before bending back toward the second side of the face plate at the second knee, the second flexible arm projecting back toward the second side of the face plate along the second return portion before terminating at the second shoulder.

4. The fastening device of claim 3 wherein:
   the first outward-extending portion defines a third plane;
   the second outward-extending portion defines a fourth plane; and
   the third plane and the fourth plane are disposed at an acute angle to one another such that the first knee and the second knee are closer to one another than the first shoulder and the second shoulder.

5. A fastening device for connecting a mountable vehicle component to a hole in a first panel, the fastening device comprising:
   a face plate including a first side and a second side, the face plate defining a first plane;
   a cantilevered extension plate including a proximal end and a distal end, the extension plate connected to the face plate at the proximal end and projecting away from the first side of the face plate toward the distal end, the extension plate defining a second plane disposed at an offset angle from the first plane; and
   a retention member connected to the face plate and projecting away from the second side of the face plate, the retention member including:
   a first flexible arm projecting away from the second side of the face plate, the first flexible arm including a first knee, a first shoulder and a third shoulder, the third shoulder spaced apart from the first shoulder by a first notch;
   a second flexible arm projecting away from the second side of the face plate, the second flexible arm including a second knee, a second shoulder and a fourth shoulder, the fourth shoulder spaced apart from the second shoulder by a second notch;
   wherein:
   the first knee and the second knee move toward one another and contact each other when an external force is exerted on the extension plate; and
   the first shoulder and the third shoulder are configured to engage a first edge of the hole to retain the face plate to the first panel, and the second shoulder and the fourth shoulder are configured to engage a second edge of the hole to retain the face plate to the first panel.

6. The fastening device of claim 5 wherein:
   the first flexible arm includes a first neck portion with a first height, the first neck portion connecting the face plate to a first outward-extending portion; and
   the first height of the first neck portion is less than a height of the first notch such that the first neck portion fits between the first shoulder and the second shoulder in the first notch when the first flexible arm flexes toward the first outward-extending portion.

7. A fastening device for connecting a mountable vehicle component to a hole in a first panel, the fastening device comprising:
   a face plate including a first side and a second side, the face plate defining a first plane;
   a cantilevered extension plate including a proximal end and a distal end, the extension plate connected to the face plate at the proximal end and projecting away from the first side of the face plate toward the distal end, the extension plate defining a second plane disposed at an offset angle from the first plane; and
   a retention member connected to the face plate and projecting away from the second side of the face plate, the retention member including a first shoulder configured to engage an edge of the hole to retain the face plate to the first panel, wherein the first shoulder of the retention member is configured to move from a first position to a second position, the first shoulder flexing toward a center of the face plate in the first position to permit the retention member to pass through the hole in the first panel, and the first shoulder flexing away from the center of the face plate in the second position to engage the edge of the hole in the first panel to retain the face plate to the first panel.

8. The fastening device of claim 1 wherein the face plate includes a first footing and a second footing, the first footing disposed above the retention member and configured to fit flushly against the first panel, the second footing disposed below the retention member and configured to fit flushly against the first panel.

9. The fastening device of claim 1 wherein the face plate, the extension plate and the retention member are integrally formed from a single blank of metal.

10. The fastening device of claim 1 wherein the extension plate includes an attachment point at the distal end for connecting the mountable vehicle component to the fastening device.

11. The fastening device of claim 10 wherein the attachment point comprises a rectangular hole configured to receive a clip nut.

12. The fastening device of claim 1 further comprising an anti-rotation tab projecting away from the second side of the face plate, the anti-rotation tab configured to engage a second edge of the hole to prevent rotation of the face plate relative to the first panel.

13. The fastening device of claim 1 wherein the offset angle is less than 90 degrees.

14. The fastening device of claim 1 wherein the offset angle is 60 degrees.

15. The fastening device of claim 2 wherein the first return portion bends toward the first outward-extending portion to form the first shoulder.

16. The fastening device of claim 2 wherein the first outward-extending portion, the first knee and the first return portion form a U-shape.

\* \* \* \* \*